United States Patent [19]

Cornelius

[11] 4,108,200
[45] Aug. 22, 1978

[54] BRAKE APPARATUS FOR IRRIGATION LINE

[75] Inventor: Gail Cornelius, Portland, Oreg.

[73] Assignee: R. M. Wade & Co., Portland, Oreg.

[21] Appl. No.: 746,456

[22] Filed: Dec. 1, 1976

[51] Int. Cl.² .............................................. B05B 3/06
[52] U.S. Cl. .................................. 137/344; 188/170; 239/177; 239/212
[58] Field of Search ...................... 137/344; 188/170; 239/177, 212, 213

[56] References Cited

U.S. PATENT DOCUMENTS

| | | | |
|---|---|---|---|
| 3,237,867 | 3/1966 | Hogg | 239/212 |
| 3,583,428 | 6/1971 | Cornelius | 137/344 |
| 3,684,180 | 8/1972 | Gorzell | 239/212 |
| 3,692,045 | 9/1972 | Carr | 137/344 |
| 3,750,696 | 8/1973 | Cornelius | 137/344 |
| 3,952,952 | 4/1976 | Townsend | 137/344 X |

FOREIGN PATENT DOCUMENTS 246,424  8/1963  Australia ............................ 239/212

*Primary Examiner*—Gerald A. Michalsky
*Attorney, Agent, or Firm*—Phillips, Moore, Weissenberger, Lempio & Majestic

[57] ABSTRACT

In a system including, for example, an irrigation line supported by towers and rotatable about a central pivot, a plurality of towers are driven by water motors and include brake systems. Each brake system provides that upon sufficient water pressure being supplied to drive the water motor of that tower, the brake is released, and conversely, as such water pressure falls below a certain level, the brake is applied. The line also includes control means for providing that, as one tower travels faster or slower than adjacent towers, water pressure supplied to the water motor of that tower is adjusted to compensate for such travel.

16 Claims, 8 Drawing Figures

FIG_1

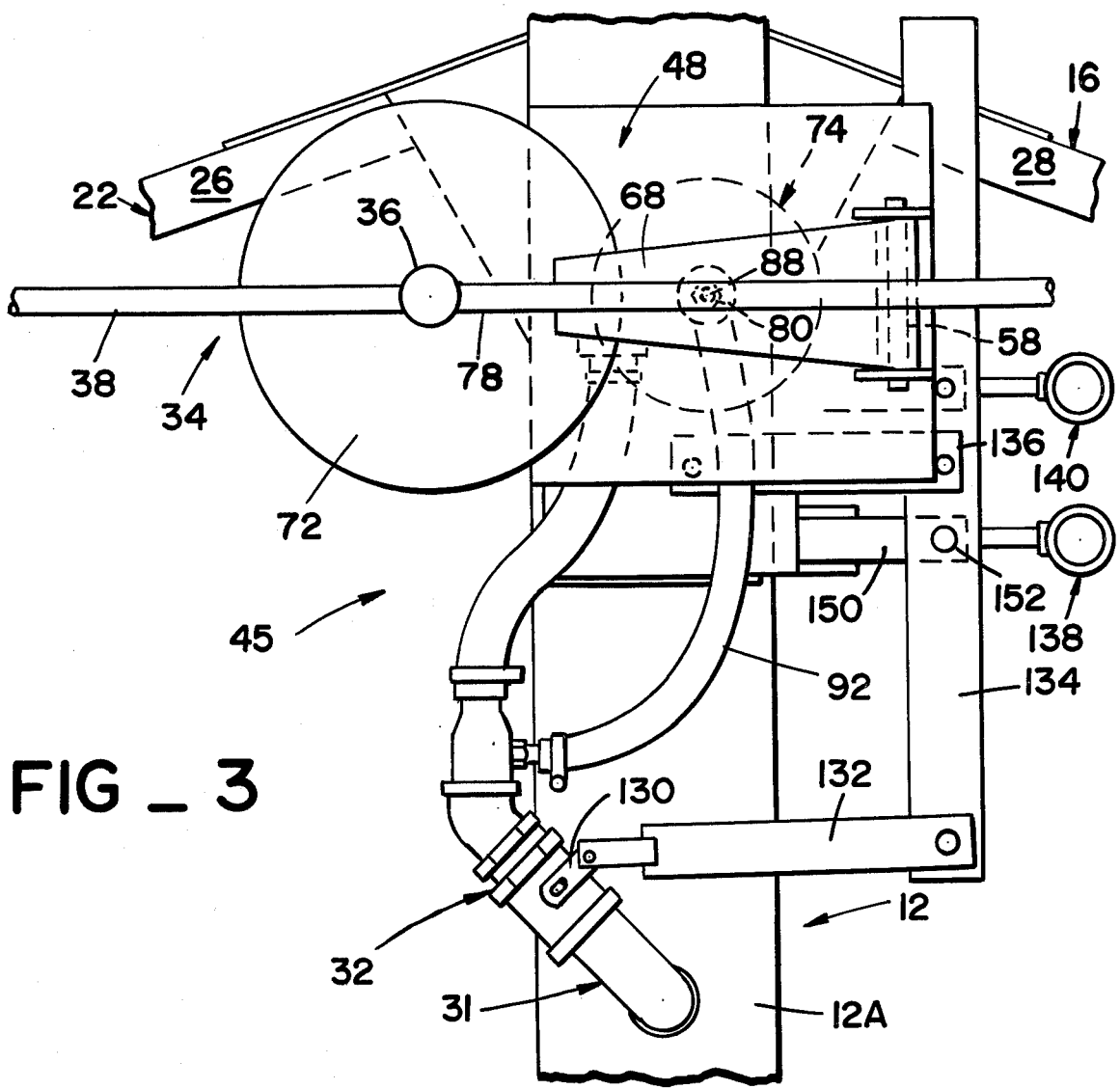
FIG_3
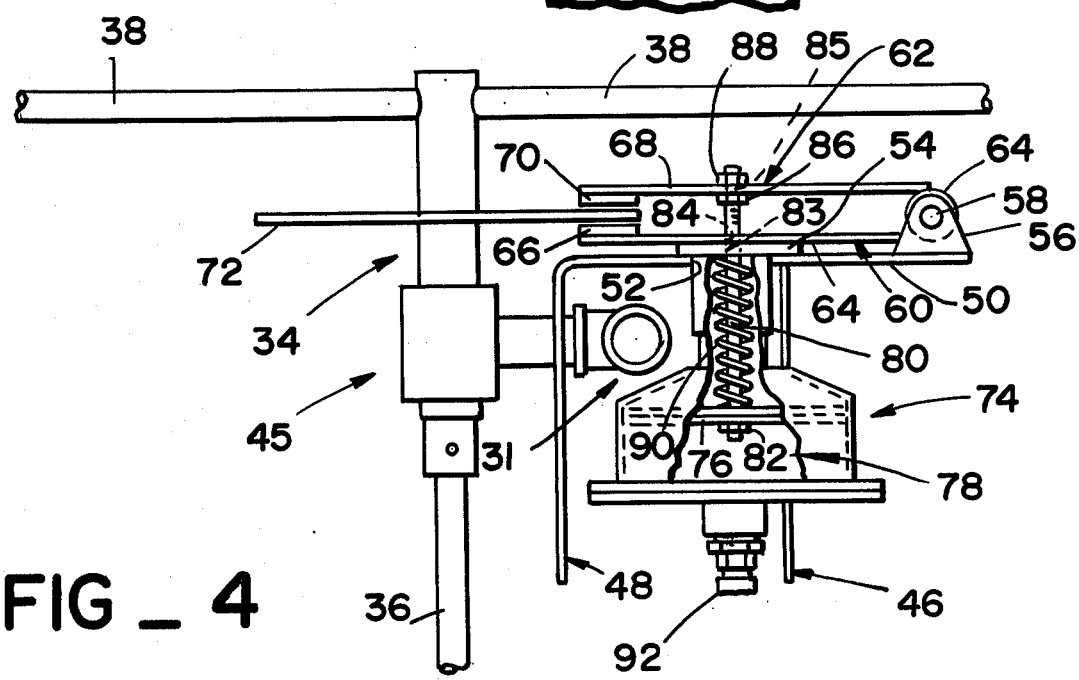
FIG_4

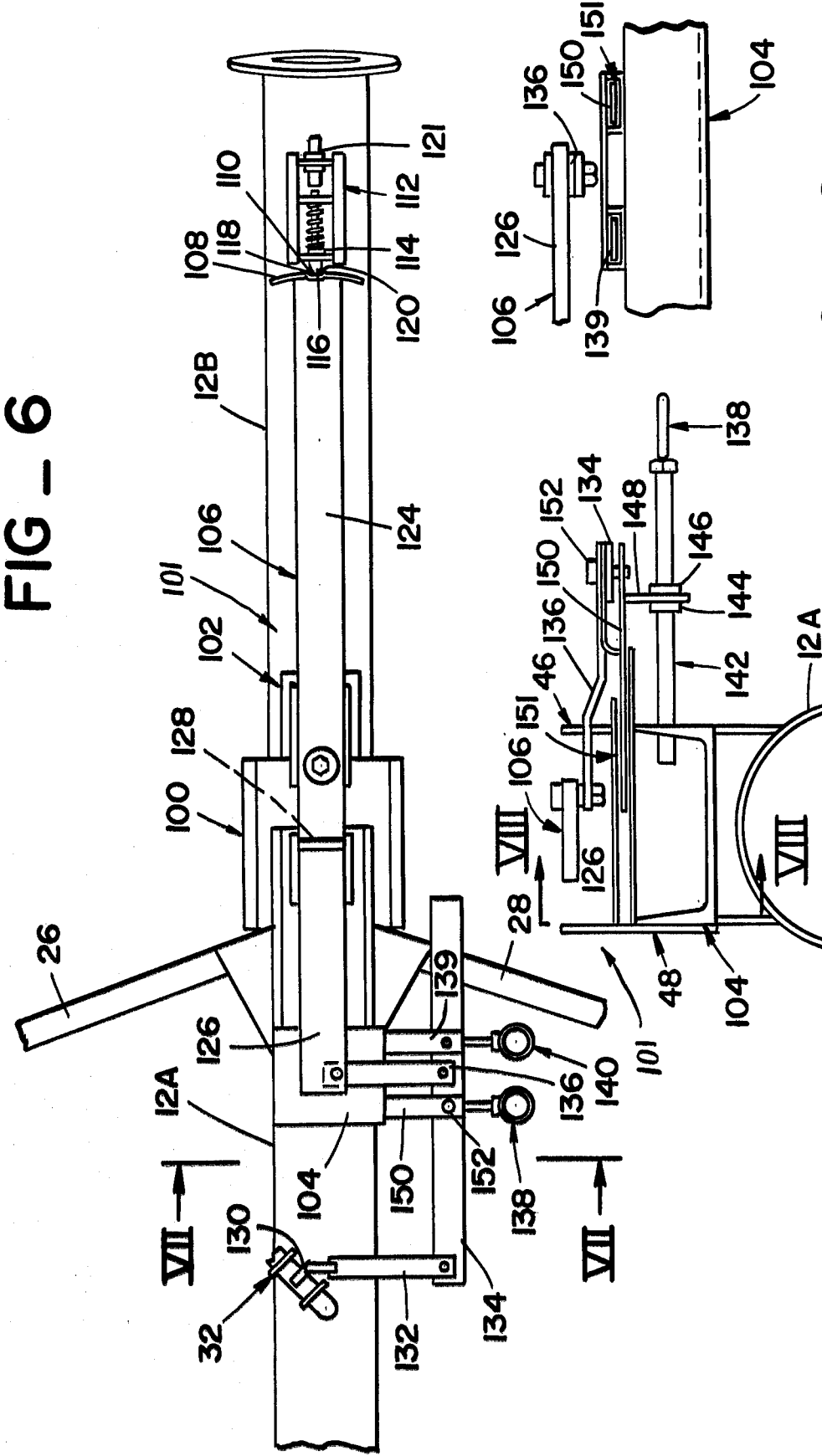

BRAKE APPARATUS FOR IRRIGATION LINE

BACKGROUND OF THE INVENTION

This invention relates to drive apparatus for an irrigation line, and more particularly, to a drive apparatus including brake means and control means for providing that the movement of such irrigation line is properly controlled.

U.S. Pat. No. 3,952,952 discloses a braking system for an air-powered sprinkler system. In such apparatus, a brake is mounted on a drive tower and is urged into direct engagement with the inside of a drive wheel rim. Such actuation takes place through the pressurization of an air cylinder. It is to be understood that, with the tremendous amount of weight and momentum of a moving system of the type disclosed in U.S. Pat. No. 3,952,952, including the consideration that the water supply pipe itself carries a great weight of water, an extremely large braking force is required to stop movement of such system.

Of more general interest in this area are U.S. Pat. No. 3,386,661, U.S. Pat. No. 3,606,161, U.S. Pat. No. 3,690,343, U.S. Pat. No. 3,766,937, and U.S. Pat. No. 3,886,836, each of which discloses an irrigation system transportable through reciprocation of a bar which engages with flanges on the outer periphery of the support wheels.

In the overall control of movement of an irrigation line, it is also important that the line be kept in substantial alignment during the operation thereof, i.e., that one part not be allowed to run ahead of or fall behind other parts thereof. In this direction, it is well known to provide an irrigation line made up of a plurality of sections connected by flexible couplings, and to provide means for providing more or less driving torque to the wheels of a particular tower as that tower lags behind or leads other towers in movement. Such a system is generally disclosed in U.S. Pat. No. 2,604,359 to Zyback. It would highly advantageous to provide such a system wherein braking means of the type described above further provide control of overall movement of the system.

SUMMARY OF THE INVENTION

It is accordingly an object of this invention to provide means for controlling the motion of an irrigation line, including brake means which provide extremely high braking efficiency when in use.

It is a further object of this invention to provide means which, while fulfilling the above object, include brake means which are responsive to a buildup in water pressure in the line to release the braking force, and is responsive to a drop in water pressure in the line to apply the braking force.

It is a still further object of this invention to provide means which, while fulfilling the above objects, include means which, upon bending of an irrigation line during motion thereof wherein one tower runs ahead or behind other towers, varies the driving torque applied to the wheels of that tower in such a manner as to compensate for such running ahead or running behind thereof.

It is a still further object of this invention to provide means which, while fulfilling the above objects, are extremely simple in design and effective in use.

Broadly stated, the irrigation line braking apparatus comprises frame means for supporting an irrigation line. Drive means are included, comprising rotatable support means mounted to the frame means and on which the frame means are supported with the support means on the ground. Rotary means are rotatably mounted relative to the frame means and are rotatable upon supply of water pressure thereto. Means operatively couple the rotary means and rotatable support means for providing that the rotary means apply driving torque therethrough to the rotatable support means. Brake means are operatively associated with the drive means for providing braking of the irrigation line upon water pressure supplied to the rotary means falling below a certain level, and for providing release of braking of the irrigation line upon water pressure supplied to the rotary means rising above the certain level.

Broadly stated, the invention also comprises irrigation line control apparatus comprising frame means for supporting an irrigation line, and drive means comprising rotatable support means mounted to the frame means and on which the frame means are supported with the support means on the ground. Further included are rotary means rotatably mounted relative to the frame means and rotatable upon supply of water pressure thereto. Means operatively couple the rotary means and rotatable support means for providing that the rotary means apply driving torque therethrough to the rotatable support means. Further included are control means operatively interconnecting the rotary means and the irrigation line for providing that, upon bending of the irrigation line in a direction such that a portion of the irrigation line adjacent the control means runs ahead of adjacent portions of the irrigation line, the pressure of water supplied to the rotary means is decreased to decrease the driving torque thereof, the control means operatively interconnecting the rotary means and irrigation line further providing that, upon bending of the irrigation line in a direction such that a portion of the irrigation line adjacent the control means runs behind adjacent portions of the irrigation line, the pressure of water supplied to the rotary means is increased to increase the driving torque thereof. The control means comprise valve means relatively openable to increase the pressure supplied to the rotary means, and relatively closable to decrease water pressure supplied to the rotary means, and means operatively interconnecting the irrigation line and valve means for providing that, upon bending of the irrigation line in the direction such that a portion of the irrigation line adjacent the control means runs ahead of adjacent portions of the irrigation line, the valve means is relatively closed, and for providing that, upon bending of the irrigation line in a direction such that a portion of the irrigation line adjacent the control means runs behind adjacent portions of the irrigation line, the valve means is relatively opened. The means operatively interconnecting the irrigation line and valve means comprise first mounting means secured relative to the irrigation line, second mounting means secured relative to the irrigation line and spaced from the first mounting means, bar means secured relative to the first mounting means and generally spanning the first and second mounting means, a first link pivotally connected to the valve means, a second link pivotally connected to the first link, and a third link pivotally connected to the bar means and the second link, the second link being pivotally mounted relative to the second mounting means.

BRIEF DESCRIPTION OF THE DRAWINGS

These and other objects of the invention will become apparent from a study of the following specification and drawings, in which:

FIG. 3 is a plan view of the upper portion of the apparatus of FIG. 2;

FIG. 4 is a side elevation, partially broken away, of the apparatus shown in FIG. 3;

FIG. 6 is a plan view of the apparatus as shown in FIG. 5;

FIG. 7 is a view taken along the line VII—VII of FIG. 6; and

FIG. 8 is a view taken along the line VIII—VIII of FIG. 7.

DESCRIPTION OF THE PREFERRED EMBODIMENT

Figure 1:
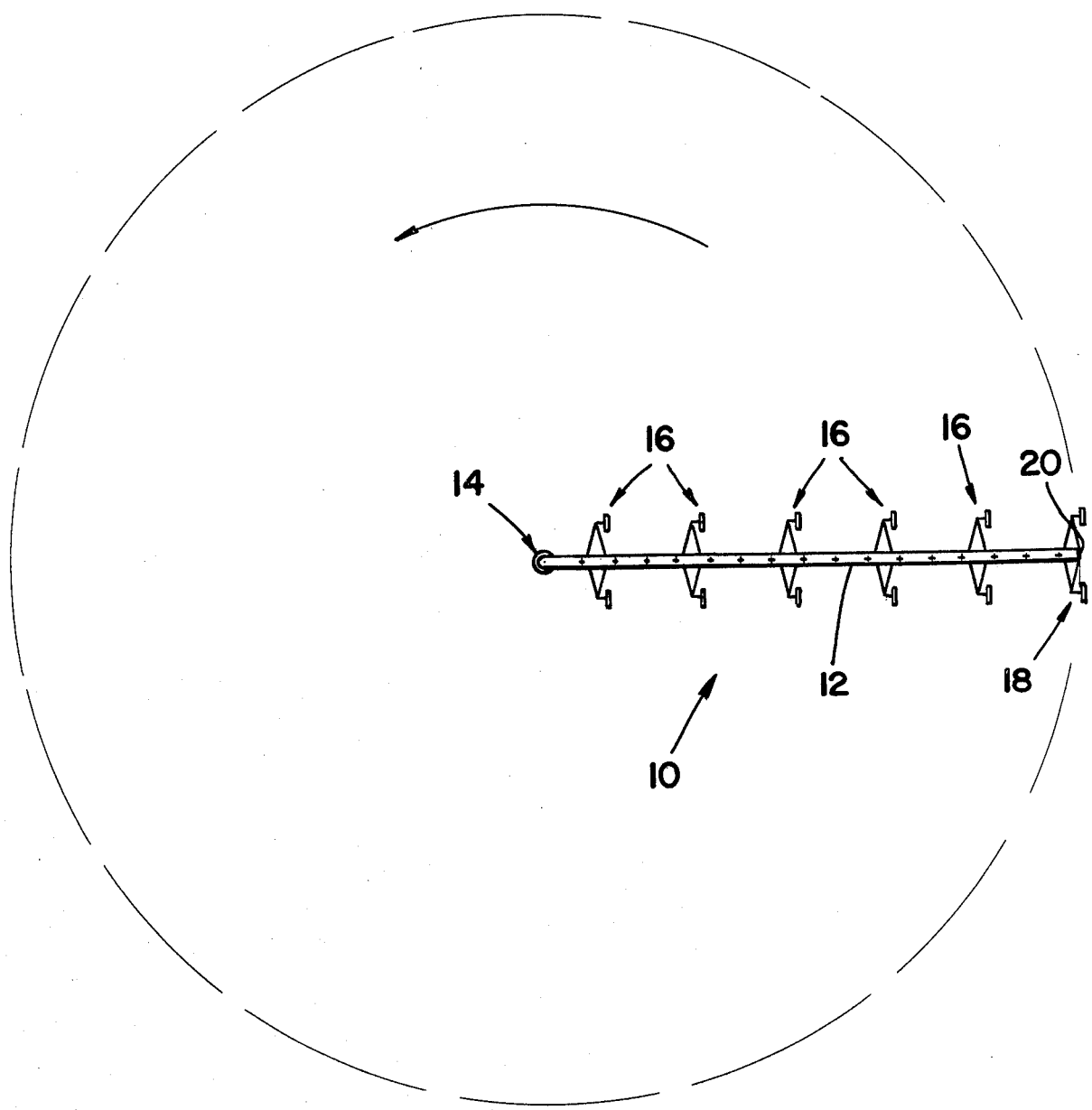
FIG. 1 is a plan view of a pivot irrigation apparatus incorporating the invention.

Generally shown in FIG. 1 is an irrigation system 10 of the pivot type, including a line 12, an end 14 of which is pivotally secured relative to the ground. The line 12 is supported by towers 16 positioned at spaced intervals along its length, and an end tower 18 in association with the extended end 20 of the line 12.

Figure 2:
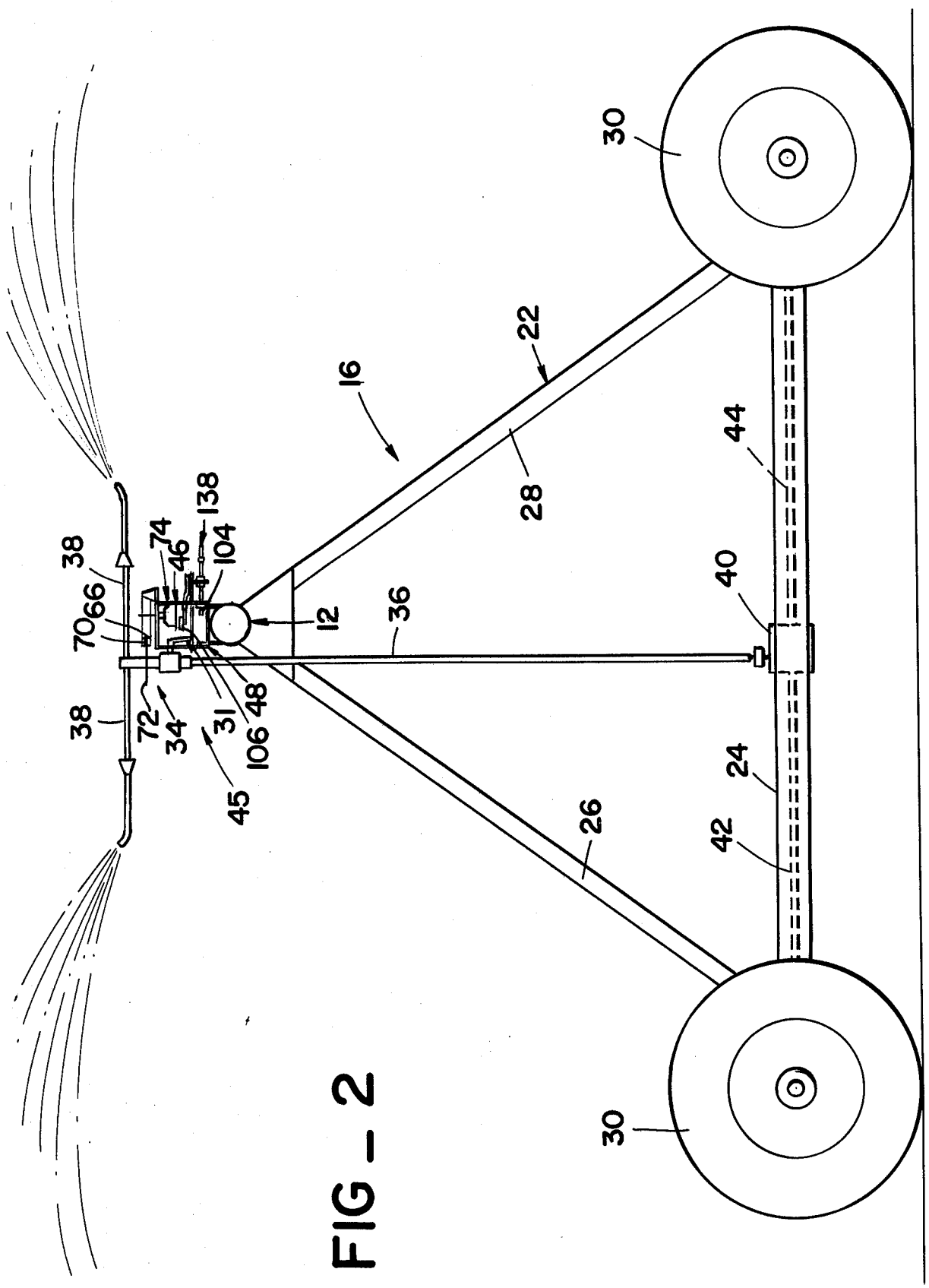
FIG. 2 is a side elevation of a tower of the line of FIG. 1, incorporating the invention.

Shown in FIG. 2 is a tower 16 including frame means 22 on which the irrigation line 12 is supported generally transversely thereof. The frame means 22 include a lower frame member 24, and upwardly and inwardly extending frame members 26, 28 forming an overall triangulated structure. The lower frame member 24 has rollingly fixed thereto rotatable support means in the form of wheels 30.

Figure 5:
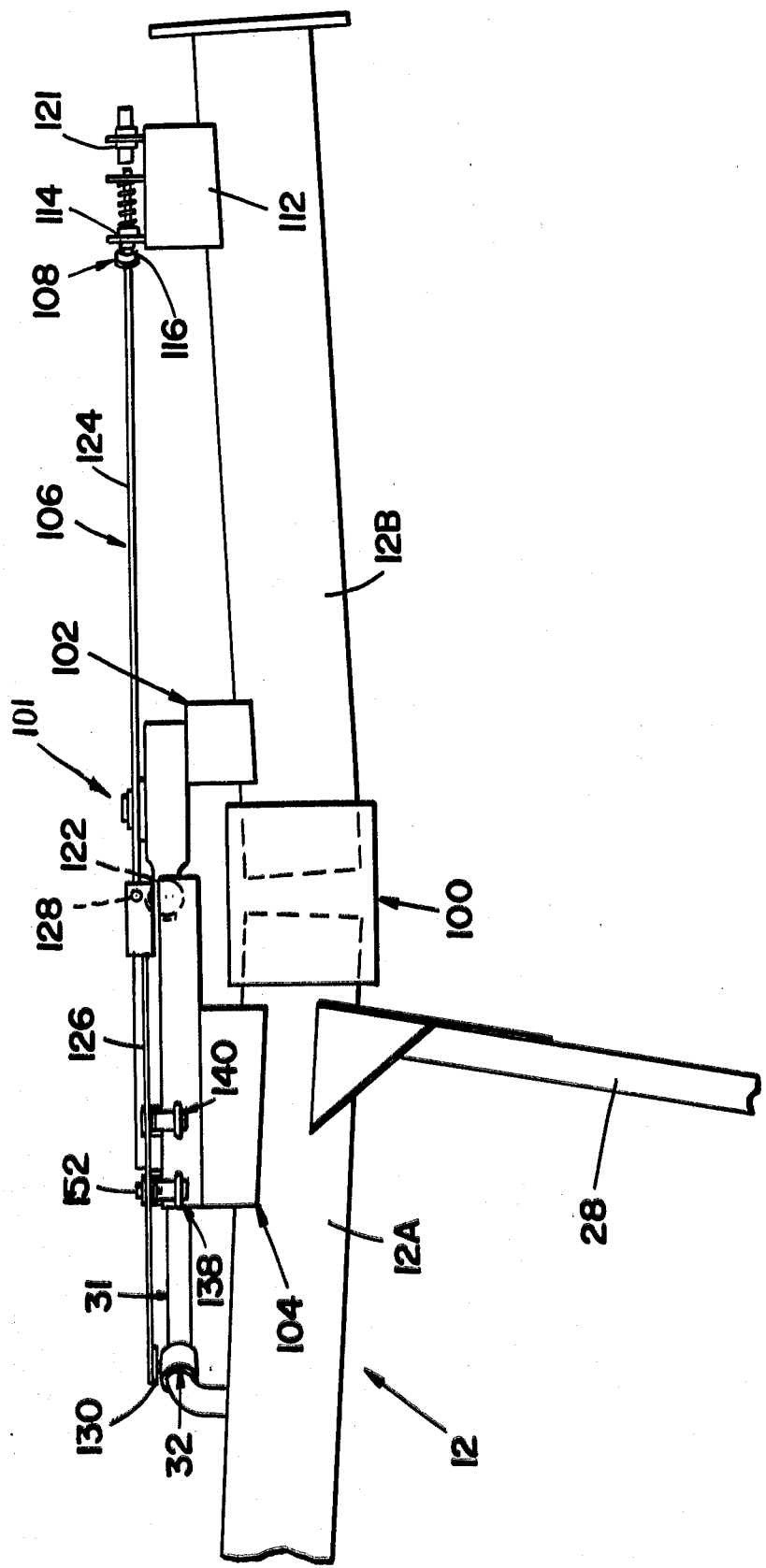
FIG. 5 is a side elevation of a portion of the apparatus as shown in FIG. 2.

In such a system, it is well known to provide that the irrigation line 12 is made up of a plurality of individual sections with each tower 16, 18 including water motor means for driving the wheels which support that tower 16, 18. A pair of such sections 12A, 12B are shown, for example, in FIGS. 5 and 6, connected by a coupler 100 which allows for movement of one section relative to another.

The particular drive system of any of the towers 16 is shown in FIG. 2. As shown therein, and also in FIGS. 3 and 4, water under pressure is supplied from the irrigation line 12 through conduit 31 and through a relatively openable and closable valve 32 in said conduit 31 to rotary means 34, including a vertically disposed shaft 36, and tubular arms 38 fixed thereto, through which the water may exit. It will be seen that water supplied from the line 12 travelling through the valve 32 and conduit 31, and exiting from the ends of the arms 38, tends to turn the shaft 36 about its longitudinal axis. The bottom portion of the shaft 36 connects with a gear box 40, through which are driven forwardly and rearwardly extending shafts 42, 44, in driving engagement with the respective wheels 30. Through such water motor means 34, driving torque is applied to the wheels 30 to drive the tower 16.

It will also be seen that relative opening of the valve 32 provides an increase in water pressure supplied to the water motor means 34 to increase the driving torque applied to the wheels 30. Conversely, relative closing of the valve 32 decreases water pressure supplied to the rotary means 34 to thereby decrease driving torque applied to the wheels 30.

Referring to FIGS. 5–8, control means 101 are included for aiding in providing alignment of the line 12. In such control means 101, first mounting means 102 are fixed to the section 12B on one side of the coupling 100, and second mounting means 104 are fixed to the section 12A on the other side of the coupling 100. Bar means 106 are secured to the first mounting means 102, and generally span the first and second mounting means 102, 104. The bar means 106 extends away from the coupling 100 and has a curved end as shown at 108, defining a central depression 110. A base 112 is secured to the section 12B adjacent this end 108, and has reciprocably mounted in vertical plates thereof a plunger 114. The plunger 114 is resiliently biased toward the end 108 so that a head 116 thereof seats in the depression 110. The plunger 114, when seated in the depression 110, serves to hold the bar means 106 in position relative to the first mounting means 102. Yet, it will be seen that if excessive relative lateral force is placed on the bar means 106 relative to the base 112, the bar means 106 will move relative thereto, forcing the plunger 114 up one or the other ramp surfaces 118, 120 of the end 108, to release the holding of the bar means 106 relative to the first mounting means 102.

The first and second mounting means 102, 104 are connected by a ball and socket joint 122 directly above the coupling 100 as shown. Through the coupling 100 and ball and socket joint 122, it will be seen that relative motion of one pipe section relative to another is allowed in a variety of directions. This allows the line 12 to roll over, for example, uneven terrain. In fact, the bar means 106 are made up of a pair of bar sections 124, 126 connected by a hinge pin 128 positioned transversely of the line, to allow the towers 16 to move over uneven terrain.

The valve actuating arm 130 has pivotally mounted thereto a first link 132, which in turn has pivotally mounted thereto a second link 134. A third link 136 is pivotally connected to the bar section 126 and the second link 134. A pair of adjustment members 138, 140 are included, each being identical in configuration, one being shown in FIG. 7. As shown therein, the adjustment member 138 includes an elongated portion 142 threadably engaged with the mounting means 104, and a pair of collars 144, 146 intermediate its length. The adjustment member 138 is disposed through a bore in a flange 148, the flange 148 being fixed to a slide bar 150 slidably disposed in a pocket 151 fixed to the mounting means 104. Turning of the adjustment member 138 moves the slide bar 150 inwardly and outwardly relative to the mounting means 104. A removable pivot pin 152 may be inserted in registered apertures defined by the slide bar 150 and link 134 to pivotally connect them. It will be seen that this pivot connection may be adjusted relative to the mounting means 104 inwardly and outwardly thereof by appropriate turning of the adjustment member 138.

As described above, the adjustment member 140 is identical in configuration and operation with the adjustment member 138, and a removable pivot pin may be inserted in registered apertures defined by the slide bar 139 associated with adjustment member 146 and link 134, in a similar manner. The link 136 is disposed generally between the adjustment members 138, 140, and it is to be understood that the link 134 may be pivotally connected to the slide bar of either adjustment member as required, as will be further described.

A first bracket 46 has its lower end fixed to the mounting means 104, and extends upwardly therefrom.

A second bracket 48 also has its lower end fixed to the mounting means 104, and includes an angled portion 50 to which is fixed the upper end of the bracket 46. The angled portion 50 defines a passage 52 over which is fitted a plate 54, the plate 54 being fixed to the angled portion 50 of the bracket 48. The angled portion 50 has spaced ears 56 secured thereto and a pin 58 interconnects the spaced ears 56. Arm means 60 are mounted to the spaced ears 56, and rest on the plate 54. Arm means 62 are secured to a tubular member 64 disposed about the pin 58, so that the arm means 62 are movably mounted relative to the frame means 22. The arm means 60 are made of an arm 64, and an arm means portion 66 comprising a pad at the extended end thereof. Likewise, the arm means 62 are made up of an arm 68, and an arm means portion 70 comprising a pad fixed to the arm 64 at the extended end thereof.

A thin disc 72 is fixed to the shaft 36, and is positioned so that it extends between the pads 66, 70, i.e., the pad 66 and pad 70 are positioned on opposite sides of the disc 72.

A housing 74 is fixed to the lower surface of the angled portion 50, has a movable wall 76 disposed therein, the housing 74 and movable wall 76 defining a chamber 78. A vertical rod 80 extends through the wall 76 and has a nut 82 threadably engaged with the lower end thereof on the lower side of the wall 76. The rod 80 extends through the passage 52 in the angled bracket, and through appropriate passages 83, 84 in the plate 54 and arm 64, and also passage 85 in the arm 68. Nuts 86, 88 are threadably engaged with the extended end of the rod 80 on opposite sides of the arm 68 as shown. It will be seen that movement of the wall 76 in a downward direction moves the arm means 62 in a first direction to bring the pad 70 into engagement with the disc 72. Further movement of the wall 76 downward forces the disc 72 to bend very slightly adjacent its edge to bring the disc 72 into engagement with the pad 66. Conversely, movement of the wall 76 in the other, upward direction moves the arm 68 upward, so as to move the pad 70 away from the disc 72, allowing the disc 72 to straighten and remove itself from the pad 66.

A resilient spring 90 is disposed between the plate 54 and wall 76, to bias the well 76 in the downward direction, tending to apply force to the disc 72 on opposite sides thereof.

A branch conduit 92 interconnects the conduit 31 and the chamber 78, so that water pressure in the line 2 driving the rotary means 34 through the valve is applied to the chamber 78.

In the use of the apparatus, without water pressure being applied to the line 12, there will be no pressure buildup in the chamber 78, so that the resilient spring 90 acts to move the wall 76 downward to engage the brake. Assuming that it is desired that the line 12 be driven in a counterclockwise direction, an appropriate pin 152 is disposed in the registered apertures of the slide bar 150 and link 134, with no pin being disposed in the associated apertures of the link 134 and slide bar 139. Upon application of water pressure to the line 12, such water pressure is used to drive the water motor means 34 as described above, and also is applied to the chamber 78 to move the wall 76 against the resilience of the spring 90 so that the pads 66, 70 are no longer in engagement with the disc 72, whereby the brake is released. Upon relative bending of the line 12 in a direction such that, for example, a portion of the irrigation line 12 adjacent the control means 101 runs ahead of adjacent portions of the irrigation line 12, i.e., a tower 16 runs ahead of the other towers 16, the bar means 106 will be pivoted relative to the second mounting means 104 to move the link 136 to in turn pivot the second link 134 about the pin 152, to move the first link 132 to in turn move the valve actuating arm 130 to relatively close the valve 32. This decreases water supply to the rotary means 34 of that tower 16, tending to slow the tower 16 down to bring it back into line with the other towers 16. Additionally, since pressure supplied to the rotary means 34 is decreased, pressure supplied to the chamber 78 is also decreased, providing for a degree of application of the brake in accordance with the above description. Thus, highly effective slowing down of the travel of the tower 16 is achieved, to bring such tower 16 into line with the other towers 16. Conversely, upon bending of the irrigation line 12 in a direction such that a portion of the irrigation line 12 adjacent the control means 101 runs behind adjacent portions of the irrigation line 12, i.e., the tower 16 runs behind other towers 16, the bar means 106 will move in an opposite direction relative to the mounting means 104, pivoting the actuating arm 130 of the valve 32 in an opposite direction through the links 136, 134, 132, to increase pressure of water supplied to the rotary means 34 to increase the driving torque thereof. If the pressure should drop in a state wherein a tower 16 is behind other towers 16 in travel, and where that tower 16 is being driven uphill, pressure will drop in the chamber 78 so that the brake will be applied to insure that that tower 16 does not roll back downhill. This condition will hold until sufficient pressure is built up to release the brake.

Assuming, for example, the state wherein the entire irrigation line 12 descends a grade and stays substantially aligned, the irrigation line 12 will tend to speed up to a point that is incompatible with even irrigation of the field. This is so because the system described herein is highly efficient, i.e., a given rate of drive speed of the overall system is achieved with a minimum discharge from the water motors. In such state, since the rotation of the shaft 36 is being forced faster than would be the case over level ground, pressure in the line 12 and the conduit 31 drops to an extent. This drop is read in the chamber 78 through the branch conduit 92, so that the resilient spring 90 moves the wall 76 downward, to bring the pad 70 into engagement with the disc 72, to force the disc 72 in turn into engagement with the pad 66, to apply the brake. Thus, the brake is applied at each tower 16 at an appropriate time as the line 12 tends to speed up moving over a downhill portion of the ground. Upon pressure buildup in the system indicating a return to, for example, level ground, pressure increases in the chamber 78 to move the wall 76 upward in the housing 74 against the resilience of the spring 90, so that the pads 66, 70 are no longer in engagement with the disc 72, and the brake is released.

Upon extreme bending of the pipe section 12B relative to the pipe section 12A to a point where, for example, the valve 32 is at an extreme stop in one or the other directions, the plunger 114 will be forced from the depression 110 in the end 108, and moved rightwardly as shown in the drawings by one of the ramps 118, 120 into contact with an actuating member 121 which cuts off water supply to the water motors of the system. Thus, it is insured that upon such undesired extreme bending of one pipe section relative to another, the entire system is shut down.

If it desired that the line be driven in a clockwise direction, the pin 152 is removed from connection of the slide bar 150 and link 134, and is disposed in registered apertures of the slide bar 139 and link 134. It will be seen that because of the positioning of the link 136 between the adjustment members 138, 140 and slide bars 150, 139, the entire operation is reversed so that proper opening and closing of the valve 32 takes place in accordance with appropriate conditions, i.e., the valve 32 opens to supply increased pressure when needed, and closes to supply decreased pressure when needed. The adjustment members 138, 140 can be adjusted so that the proper degree of valve 32 opening and closing can be achieved, whether the line 12 is being driven in the clockwise or counterclockwise direction.

I claim:

1. Irrigation line braking apparatus comprising:
   frame means for supporting an irrigation line;
   drive means comprising rotatable support means mounted to said frame means and on which the frame means are supported with the support means on the ground; rotary drive means rotatably mounted relative to the frame means and rotatable upon supply of water pressure thereto; and means operatively coupling said rotary means and rotatable support means for providing that the rotary means apply driving torque therethrough to the rotatable support means;
   brake means operatively associated with said rotary drive means for providing braking means of the irrigation line upon water pressure supplied to said rotary means falling below a certain level, and for providing release of braking of the irrigation line upon water pressure supplied to said rotary means rising above said certain level.

2. The apparatus of claim 1 wherein the rotary means comprises a rotary shaft, and wherein the brake means comprise first means mounted to the shaft and rotatable therewith, and second means mounted relative to the frame means, the first and second means being relatively movable to provide engagement of the first and second means, to thereby provide said braking.

3. The apparatus of claim 2 wherein the second means comprise arm means movably mounted relative to the frame means, and movable in a first direction to move a portion of said arm means into engagement with the first means, and movable in a second direction to move said portion of the arm means from the first means.

4. The apparatus of claim 3 wherein the first means comprise a disc, and wherein the arm means comprise an arm pivotally mounted relative to the frame means, and wherein the arm means portion comprise pad means.

5. The apparatus of claim 4 and further comprising second arm means comprising a second arm mounted relative to the frame means, and pad means secured relative thereto, the first-mentioned and second pad means being positioned on opposite sides of the disc.

6. The apparatus of claim 5 wherein the brake means further comprise means defining a chamber and comprising a movable wall, means interconnecting the movable wall and first-mentioned arm means, so that movement of the wall in one direction moves the first arm means in said first direction, and movement of the wall in another direction moves the first arm means in said second direction, and means resiliently biasing the wall in said one direction, application of water under pressure into said chamber above said certain level moving said wall against the biasing means to move the first arm means in said second direction.

7. The apparatus of claim 3 wherein the brake means further comprise means defining a chamber and comprising a movable wall, means interconnecting the movable wall and arm means, so that movement of the wall in one direction moves the arm means in said first direction, and movement of the wall in another direction moves the arm means in said second direction, and means resiliently biasing the wall in said one direction, application of water under pressure into said chamber above said certain level moving said wall against the biasing means to move the arm means in said second direction.

8. Irrigation line control apparatus comprising:
   frame means for supporting an irrigation line;
   drive means comprising rotatable support means mounted to said frame means and on which the frame means are supported with the support means on the ground;
   rotary means rotatably mounted relative to the frame means and rotatable upon supply of water pressure thereto;
   means operatively coupling said rotary means and rotatable support means for providing that the rotary means apply driving torque therethrough to the rotatable support means;
   control means operatively interconnecting the rotary means and the irrigation line for providing that, upon bending of the irrigation line in a direction such that a portion of the irrigation line adjacent the control means runs ahead of adjacent portions of the irrigation line, the pressure of water supplied to the rotary means is decreased to decrease the driving torque thereof, the control means operatively interconnecting the rotary means and irrigation line further providing that, upon bending of the irrigation line in a direction such that a portion of the irrigation line adjacent the control means runs behind adjacent portions of the irrigation line, the pressure of water supplied to the rotary means is increased to increase the driving torque thereof;
   wherein the control means comprise valve means relatively openable to increase water pressure supplied to the rotary means, and relatively closable to decrease water pressure supplied to the rotary means, and means operatively interconnecting the irrigation line and valve means for providing that, upon bending of the irrigation line in a direction such that a portion of the irrigation line adjacent the control means runs ahead of adjacent portions of the irrigation line, the valve means is relatively closed, and for providing that, upon bending of the irrigation line in a direction such that a portion of the irrigation line adjacent the control means runs behind adjacent portions of the irrigation line, the valve means is relatively opened;
   the means operatively interconnecting the irrigation line and valve means comprising first mounting means secured relative to the irrigation line, second mounting means secured relative to the irrigation line and spaced from the first mounting means, bar means secured relative to the first mounting means and generally spanning the first and second mounting means, a first link pivotally connected to the valve means, a second link pivotally connected to the first link, and a third link pivotally connected to the bar means and the second link, the second link being pivotally mounted relative to the second mounting means.

9. The apparatus of claim 8 and further comprising means for providing adjustment of the position of the pivot of the second link and second mounting means relative to the second mounting means.

10. The apparatus of claim 9 wherein the means for providing adjustment of the position of the second link and second mounting means comprise an adjustment member movably mounted relative to the second mounting means, the second link being pivotally mounted to the adjustment member.

11. The apparatus of claim 10 and further comprising a second adjustment member movably mounted relative to the second mounting means, the third link being disposed generally between the first-mentioned and second adjustment members, and means for providing that the second link may be pivotally connected to either of the first and second adjustment members.

12. The apparatus of claim 11 wherein the irrigation line comprises a first irrigation line section, a second irrigation line section, and coupling means interconnecting the first and second sections for allowing relative movement therebetween, the coupling means being positioned adjacent the control means.

13. The apparatus of claim 12 and further comprising ball and socket means pivotally interconnecting the first and second mounting means.

14. Irrigation line controls and braking apparatus comprising:

frame means for supporting an irrigation line;

drive means comprising rotatable support means mounted to said frame means and on which the frame means are supported with the support means on the ground; rotary drive means rotatably mounted relative to the frame means and rotatable upon supply of water pressure thereto; and means operatively coupling said rotary means and rotatable support means for providing that the rotary means apply driving torque therethrough to the rotatable support means;

brake means operatively associated with said rotary drive means for providing braking means of the irrigation line upon water pressure supplied to said rotary means falling below a certain level, and for providing release of braking of the irrigation line upon water pressure supplied to said rotary means rising above said certain level;

control means comprising valve means relatively openable to increase water pressure supplied to the rotary means, and relatively closable to decrease water pressure supplied to the rotary means, and means operatively interconnecting the irrigation line and valve means for providing that, upon bending of the irrigation line in a direction such that a portion of the irrigation line adjacent the control means runs ahead of adjacent portions of the irrigation line, the valve means are relatively closed and the pressure of water supplied to the rotary drive means is decreased to decrease the driving torque thereof, and for providing that, upon bending of the irrigation line in a direction such that a portion of the irrigation line adjacent the control means runs behind adjacent portions of the irrigation line, the valve means are relatively opened and the pressure of water supplied to the rotary drive is increased to increase the driving torque thereof;

said means operatively interconnecting the irrigation line and valve means comprising first mounting means secured relative to the irrigation line, second mounting means secured relative to the irrigation line and spaced from the first mounting means, bar means secured relative to the first mounting means and generally spanning the first and second mounting means, a first link pivotally connected to the valve means, so that movement of the first link operates the valve means, a second link pivotally connected to the first link, a third pivotally connected to the bar means and the second link, the second link being pivotally mounted relative to the second mounting means, and means for providing selective adjustment of the position of the pivot of the second link and second mounting means relative to the second mounting means.

15. The apparatus of claim 14 wherein the means for providing selective adjustment of the position of the pivot of the second link and second mounting means comprise an adjustment member movably mounted relative to the second mounting means, the second link being pivotally mounted to the adjustment member.

16. The apparatus of claim 15 and further comprising a second adjustment member movably mounted relative to the second mounting means, the third link being disposed generally between the first-mentioned and second adjustment members, and means for providing that the second link may be pivotally connected to either of the first and second adjustment members.

* * * * *